US008460758B2

(12) United States Patent
Flood et al.

(10) Patent No.: US 8,460,758 B2
(45) Date of Patent: *Jun. 11, 2013

(54) PROCESS FOR THE PREPARATION OF A CROSSLINKER COMPOSITION

(75) Inventors: Lawrence A. Flood, Norwalk, CT (US); Barry A. Lawless, Milford, CT (US)

(73) Assignee: Cytec Technology Corp., Wilmington, DE (US)

( * ) Notice: Subject to any disclaimer, the term of this patent is extended or adjusted under 35 U.S.C. 154(b) by 186 days.

This patent is subject to a terminal disclaimer.

(21) Appl. No.: 12/745,996

(22) PCT Filed: Dec. 5, 2008

(86) PCT No.: PCT/US2008/085635
§ 371 (c)(1),
(2), (4) Date: Aug. 16, 2010

(87) PCT Pub. No.: WO2009/073836
PCT Pub. Date: Jun. 11, 2009

(65) Prior Publication Data
US 2010/0297356 A1 Nov. 25, 2010

Related U.S. Application Data

(60) Provisional application No. 60/992,909, filed on Dec. 6, 2007.

(51) Int. Cl.
*B05D 1/00* (2006.01)
(52) U.S. Cl.
USPC ........ 427/385.5; 427/356; 427/358; 427/384; 427/388.1; 427/389; 427/389.9; 427/391; 427/392; 427/393; 427/393.5; 427/394; 427/395; 427/396; 427/397; 427/421.1; 427/427.4; 427/430.1; 427/435; 427/439; 427/440
(58) Field of Classification Search
None
See application file for complete search history.

(56) References Cited

U.S. PATENT DOCUMENTS

| 3,420,799 | A |   | 1/1969  | Cavitt |
|-----------|---|---|---------|--------|
| 4,284,758 | A |   | 8/1981  | North |
| 4,295,846 | A | * | 10/1981 | Petersen et al. ............ 8/186 |
| 4,619,668 | A | * | 10/1986 | Frick et al. ............ 8/496 |
| 4,968,774 | A |   | 11/1990 | Didier et al. |
| 5,665,851 | A |   | 9/1997  | Wilhelm et al. |

FOREIGN PATENT DOCUMENTS

| EP | 0381905 A1 | 8/1990 |
| EP | 698627 A1 | 2/1996 |
| EP | 1065227 A2 | 1/2001 |
| WO | WO-96/17879 A1 | 6/1996 |
| WO | WO-97/11119 A1 | 3/1997 |
| WO | WO-2006/039030 A1 | 4/2006 |
| WO | WO-2007/099156 A1 | 9/2007 |
| WO | WO 2007/135108 | * 11/2007 |

OTHER PUBLICATIONS

European Search Report issued on Feb. 2, 2011 in related European Application No. 10 18 5115.

* cited by examiner

*Primary Examiner* — Erma Cameron
(74) *Attorney, Agent, or Firm* — Novak Druce Connolly Bove + Quigg LLP

(57) ABSTRACT

This invention is directed to a process for the preparation of a crosslinker composition, comprising the steps of providing a mixture of an aliphatic alcohol A having at least one hydroxyl group and from 1 to 10 carbon atoms, with at least one multifunctional aldehyde C having at least two aldehyde groups —CHO to form a mixture AC, heating the mixture AC to convert at least a part of the multifunctional aldehyde C to its hemiacetal or to its acetal to form a mixture (AC)', adding to the mixture (AC)' least one cyclic urea U or the educts to produce the said cyclic urea U in situ, which cyclic urea U has at least one unsubstituted >NH group, and reacting the mixture thus obtained to form a chemical bond between the nitrogen atom of the at least one unsubstituted >NH group of the at least one cyclic urea U5 and the carbon atom of the least one aldehyde group —CHO of the multifunctional aldehyde C, and coating compositions comprising the said crosslinker composition.

15 Claims, No Drawings

PROCESS FOR THE PREPARATION OF A CROSSLINKER COMPOSITION

RELATED APPLICATIONS

This application is a national stage application (under 35 U.S.C. §371) of PCT/US2008/85635, filed Dec. 5, 2008, which claims benefit of U.S. application 60/992909, filed Dec. 6, 2007.

FIELD OF THE INVENTION

The present invention is directed to a process for the preparation of a crosslinker composition. It is also directed to a coating composition comprising the crosslinker composition prepared by the said process, and to a method of use of the said coating composition to provide a coating on a substrate.

BACKGROUND OF THE INVENTION

Industrial coatings are used to protect the surface of a substrate against deterioration brought about by the action of light, humidity, wear, atmospheric oxygen, and other chemicals, and to impart the desired appearance such as colour, gloss, and surface structure. In many cases, such coatings are based on organic polymers which show good adhesion to the substrate and form a film free from defects such as pores or blisters. Film formation, also referred to as drying, is the transition of the coating composition applied to the solid state. The solid film can be formed from a solution by removal of solvent or from a dispersion by removal of the dispersing agent, or from a melt by cooling. In this case, and if no chemical reaction occurs, this is referred to as "physical drying". In the so-called chemical drying, chemical reactions occur during film formation which lead to crosslinked macromolecules. Such crosslinking may be caused by chemical reaction of low molar mass molecules, oligomers or macromolecules between themselves, such as addition or condensation reactions, or radiation induced or thermally induced polymerisation, or by the action of added polyfunctional molecules, the so-called crosslinkers, which react with functional groups of polymers usually referred to as binder resins.

A well-known class of crosslinkers used in conjunction with binder resins having active hydrogen-containing reactive groups, such as hydroxyl and carboxyl groups, are the so-called amino resins, adducts of formaldehyde and triazines such as melamine, which are usually at least partially etherified with lower alcohols such as methanol, and n- or iso-butanol. These crosslinkers suffer from the drawback that formaldehyde, inter alia, is liberated during the curing or crosslinking reaction. Emission of formaldehyde is environmentally undesirable. Additionally, these amino resins need temperatures typically of at least 80° C. to act as crosslinkers. Heating to such elevated temperatures is energy-consuming.

It is an object of this invention, therefore, to provide a crosslinker composition which does not liberate formaldehyde upon curing, and which initiates curing at ambient temperature or only slightly increased temperature, preferably not in excess of 80° C.

SUMMARY OF THE INVENTION

This object has been achieved by a crosslinker composition based on reaction products of cyclic ureas and multifunctional aldehydes having at least two aldehyde groups

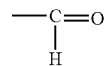

or, for short, CHO.

Such crosslinker compositions have been described in the U.S. Pat. No. 4,284,758. Reaction products are described therein which are made by reacting ethylene urea (2-imidazolidinone) with glyoxal, and optionally etherifying the adduct with methanol. While the non-etherified adduct had gelled already after storage for one week, the etherified adduct showed a viscosity increase of about 4.6-fold upon storage for ten weeks at 48° C. These etherified adducts were used to increase the resistance and stability of textile materials.

In the investigations that have led to the present invention, it has been found that coating compositions comprising active hydrogen containing resins, such as hydroxy functional alkyd, acrylic, urethane or epoxy resins can be cured with such crosslinkers even at ambient temperature. However, it was found that the appearance of the resulting coatings was not satisfactory, and the coating showed insufficient stability against solvents, and were prone to yellowing.

In further experiments conducted, it has been found, surprisingly, that another reaction sequence, i.e. first mixing and at least partially reacting the aldehyde component with an alcohol, and then reacting this mixture with a cyclic urea which may be preformed, or formed in situ, has led to crosslinker compositions that did not exhibit the said disadvantages: these crosslinker compositions do not evolve formaldehyde as they are based on aldehydes different from formaldehyde, they have led to fast cure at ambient temperature as evidenced by the evolution of hardness, and they have led to coatings having high gloss and low yellowing, and good chemical resistance.

It is an object of the invention to provide an improved crosslinker composition for binder resins having active hydrogen functionality and which not evolve formaldehyde upon curing, which exhibit fast cure at ambient temperature, and which lead to coatings having high gloss and low yellowing, and good chemical resistance.

It is a further object of the invention to provide a process to make such improved crosslinker composition.

It is yet another object of the invention to provide a combination of active hydrogen functional binder resins and a crosslinker composition that cures at ambient temperature without evolution of formaldehyde, and that leads to improved properties of the paint film such as higher hardness, better chemical stability, higher gloss and lower yellowness.

These objects have been achieved by a process for the preparation of a crosslinker composition, comprising the steps of providing a mixture AC of an aliphatic alcohol A having at least one hydroxyl group and from 1 to 10 carbon atoms, with at least one multifunctional aldehyde C having at least two aldehyde groups —CHO, and reacting the said mixture AC to convert at least a part of the multifunctional aldehyde C to its hemiacetal or to its acetal to form a mixture (AC)', adding to the mixture (AC)' least one cyclic urea U or the educts (starting products for the synthesis) to produce the said cyclic urea U in situ, which cyclic urea U has at least one unsubstituted amidic >NH group, and reacting the mixture thus obtained to form a chemical bond between the nitrogen atom of the at least one unsubstituted amidic >NH group of the at least one cyclic urea U, and the carbon atom of the least one aldehyde group —CHO of the multifunctional aldehyde C, or of the carbon atom of the at least one aldehyde group —CHO of the of the multifunctional aldehyde C which said aldehyde group is converted to a hemiacetal group or acetal group by reaction with the alcohol A. It goes without saying that even by reacting the aldehyde C to its hemiacetal or to its acetal, the carbon atom of the aldehyde group remains the same, therefore it is equivalent to say "the carbon atom of the least one aldehyde group —CHO of the multifunctional aldehyde C", and "the carbon atom of the at least one aldehyde group —CHO of the multifunctional aldehyde C which said aldehyde group is converted to a hemiacetal group or acetal group by reaction with the alcohol A".

DETAILED DESCRIPTION OF THE PREFERRED EMBODIMENTS

The aliphatic alcohols A useful for the invention have at least one hydroxyl group, and from one to ten carbon atoms. They can be linear, branched or cyclic, preferably linear or branched, and preferably have from one to eight carbon atoms, such as methanol, ethanol, n- and iso-propanol, and the isomeric butanols, particularly n-butanol, and iso-butanol, n-hexanol, or 2-ethylhexanol. Polyhydric alcohols which may be used, alone or in mixture with monohydric alcohols, include ethylene glycol, 1,2- and 1,3-propane diol, 1,2- and 1,4-butane diol, 1,2- and 1,6-hexane diol, glycerol, trimethylol ethane and trimethylol propane, pentaerythritol, diglycerol, ditrimethylol ethane and ditrimethylol propane, mannitol and sorbitol. It is also possible to employ mixtures of the monohydric alcohols, such as a mixture of methanol and iso-butanol, or mixtures of the said polyhydric alcohols with each other or mixtures thereof with monohydric alcohols.

The multifunctional aldehydes C have at least two aldehyde groups, and are preferably aliphatic in nature. Preferred aldehydes are glyoxal, succinic dialdehyde, and glutardialdehyde. It is also possible to use mixtures of these.

The cyclic ureas U which may be used according to the present invention have at least one unsubstituted amidic >NH group. These cyclic ureas U are cycloaliphatic or bicycloaliphatic compounds having an element of the structure —NH—CO—NH— within a ring structure, the total number of ring atoms preferably being from 5 to 7 (ethylene urea, 1,3-propylene urea, 1,4-butylene urea or tetramethylene urea). In the case of a bicyclic compound, the simplest structure is glycoluril or acetylene diurea. These cyclic ureas may be substituted, preferably by alkyl groups on the N- or C-atoms, or both, or by hydroxy or alkoxy groups on the C-atoms of the ring, the alkyl or alkoxy residues in both cases preferably having from one to four carbon atoms. At least one of the nitrogen atoms must remain unsubstituted to enable reaction with the aldehyde or (hemi)acetal functional molecule. Preferred cyclic ureas may also carry hydroxyl groups as substituents on one or more of the carbon atoms, 4,5-dihydroxyethylene urea being particularly preferred. It is also preferred to use mixtures of two or more of the mentioned cyclic ureas, with particular preference of mixtures of ethylene urea and dihydroxyethylene urea. Adducts of these latter mixtures of these with glyoxal which are at least partially etherified have shown particularly good reactivity at ambient temperature. Such mixtures can be prepared by reacting mixtures of the cyclic ureas with glyoxal, or by reacting the cyclic ureas individually with glyoxal, and then mixing the reaction products. The cyclic ureas used for the present invention may also be formed in situ by reaction of urea itself, or di- or polyureas, which may optionally be substituted, having one, two or more than two groups of the structure —NH—CO—NH— in their molecules with multifunctional aldehydes which have more than one aldehyde group in their molecule, preferably with dialdehydes, particularly preferably with glyoxal. As further examples, the reaction product of acetaldehyde with urea, crotonylidene urea, or the reaction product of urea and isobutyric aldehyde, isobutylidene diurea, may be reacted by addition of one molecule of glyoxal thereto. Preferably, the at least one cyclic urea U is selected from the group U1 consisting of ethylene urea, 4-hydroxyethylene urea, 4,5-dihydroxy ethylene urea, and glycoluril, and from the group U2 consisting of the ureas U1 which additionally have at least one substituent R on at least one of the nitrogen or carbon atoms of the said ureas U1, with the proviso that at least one nitrogen atom is unsubstituted, and the substituent R is selected from the group consisting of linear, branched and cyclic alkyl groups having from 1 to 10 carbon atoms.

In the process according to the invention, in the first step, the multifunctional aldehyde is charged first, and the alcohol is then added in stoichiometric excess. Another way of preparing the mixture of the aldehyde C and the alcohol A is first to charge the alcohol A, then adding the aldehyde C, optionally removing at least a part of the water if the aldehyde is used in the form of an aqueous solution, or first to charge the aldehyde C, optionally removing at least a part of the water if the aldehyde is supplied as an aqueous solution, and then adding the alcohol A. An inert gas blanket may preferably be used, such as nitrogen or argon.

The mixture thus formed is preferably heated to a temperature of from 40° C. to 120° C. to remove a part of the alcohol and the water, with preferably not more than 15% of the water of the aqueous solution being left; preferably, the water is removed to leave preferably at most from 5% to 10% of the initial quantity. An inert gas blanket may preferably also be used in this step, such as nitrogen or argon. Application of reduced pressure is favourable to help removing most of the water. During this heating step, at least a part of the aldehyde C is converted to its hemiacetal by addition of alcohol A, or partially to its acetal by addition of one molecule of alcohol A and subsequent condensation with a further molecule of alcohol A with liberation of one molecule of water.

After cooling the mixture to room temperature, more alcohol A is added, the cyclic urea U (or the educts of such cyclic urea if it is possible to form such cyclic urea under the reaction conditions employed here) is then added, and the pH is adjusted preferably to from 1.0 to 4.0 by addition of acid. Addition of a dialdehyde to the amidic >NH group of the cyclic urea (which may be preformed or formed in situ) yields a structure of the formula >N—CH(OH)—X where X stands for the dialdehyde where one of the —CHO groups has been removed. The reaction mixture is heated and kept at elevated temperature until the aldehyde groups are consumed and at least a part, preferably at least 40% of the hydroxyl groups formed by addition of the aldehyde to the amidic >NH group have been converted to ether groups by reaction with the excess alcohol. The remaining excess alcohol is removed by distillation under reduced pressure to the desired degree, yielding a mass fraction of solids of preferably from 55% to 90%, particularly preferably from 60% to 80%.

As already explained supra, the cyclic ureas U may be added to the mixture prepared from the alcohol A and the aldehyde C as such, or they may also be formed in situ, from educts such as urea, diureas and polyureas, for instance by reacting urea with glyoxal to form the adduct, dihydroxyethylene urea, or glycoluril.

The crosslinker composition solutions thus obtained can be combined both with solvent borne and with water borne binder resins having active hydrogen functionality (hydroxyl or carboxylic acid groups). Although the qualitative composition of an ethylene urea/glyoxal resin prepared according to the invention is similar to that described in the cited U.S. Pat. No. 4,284,758, it was found that the crosslinker compositions prepared according to the invention have a higher reactivity and can be used for curing even at room temperature, and that the appearance of the cured films is also favourable for the crosslinkers according to the present invention, in yellowness and gloss and haziness.

This favourable performance could not have been expected from changing the sequence of reaction steps.

In further experiments conducted in connection with this invention, it has also been found that addition of boric acid to the crosslinker composition of the present invention can further improve the colour of the said crosslinker composition. This effect is particularly marked if boric acid is added to the mixture AC, comprising an aliphatic alcohol A and at least one multifunctional aldehyde C, or, in the alternative, to the mixture (AC)', i.e. to a mixture that comprises the reaction product of the aldehyde C and of the alcohol A, in the form of the acetal or hemiacetal of the aldehyde C. It is also possible, with good results, to add boric acid in two portions, one portion to the mixture AC, and one portion to the mixture (AC)'. It has been found that the optimum quantity of boric acid, measured as the ratio of the amount of substance $n_B$ of boric acid $H_3BO_3$, to the sum $n_G$ of the amounts of substance of glyoxal, of the hemiacetal and of the acetal of glyoxal, is from 0.5% to 25%, preferably from 1% to 20%, and particularly preferred, from 3% to 15%. Combining binder resins with such boric acid-modified crosslinkers leads to coatings having particularly low yellowness index, and good colour retention.

It has been verified that the crosslinker compositions according to the invention can be combined with solvent borne or water borne resins having hydroxy or carboxylic acid functionality, or both, particularly with hydroxy or carboxylic acid functional alkyd resin, hydroxy or carboxylic acid functional acrylic resins, hydroxy functional polyurethane resins, and hydroxy functional epoxy resins. As these crosslinker compositions are active already at ambient temperature, they are particularly useful to cure coatings on heat sensitive substrates, such as paper, cardboard, textiles, leather, wood, and also plastics. Application of said crosslinker composition in combination with the binder resins mentioned supra can also be considered where cure temperature or energy savings are an issue. Usual additives such as defoamers, adhesion promotors, wetting agents, sag control agents, and pigments can, of course, be used in paint formulations comprising the crosslinker compositions of the present invention.

The coating compositions can be applied by any of the known techniques such as spraying, dipping, brushing, and using a doctor blade.

The following examples illustrate the invention, without intending to limit. All concentrations (strengths) and ratios stated in "%" are mass fractions (ratio of the mass $m_B$ of a specific substance B, divided by the mass m of the mixture, in the case of a concentration, or by the mass $m_D$ of the second substance D, in the case of a ratio).

EXAMPLE 1

Butylated Ethyleneurea-Glyoxal Resin

A resin according to the invention was prepared by the following procedure:

72.6 g (0.5 mol) of a 40% strength aqueous solution of glyoxal at room temperature (23° C.) is charged to the reaction vessel under a nitrogen purge followed by 748 g (4.9 mol) of 1-butanol. The mixture was heated to 62° C., and excess butanol was removed under reduced pressure (210 Torr [28 kPa] ramped to 140 Torr [19 kPa]) while allowing the reaction temperature to rise to a maximum of 72° C. After 2 hours, approximately one-quarter of the excess butanol had been removed and the mass fraction of water remaining in the reaction mixture was less than 5%. The reaction solution was then cooled to ambient temperature.

To the dehydrated glyoxal solution, 148 g (2 mol) of 1-butanol and 48 g (0.5 mol) of ethylene urea hemihydrate were charged. The pH was adjusted to 2.3 with 26% strength aqueous sulphuric acid, and the reaction temperature was then raised and maintained at from 57° C. to 63° C. for approximately 90 minutes. After 90 minutes, the reaction mixture was then concentrated under reduced pressure (130 Torr [17 kPa]) while heating up to a maximum temperature of 78° C. The light yellow resin solution (170 g) was then cooled to 30° C. and 38 g of 1-butanol were charged to obtain a final Gardner-Holdt viscosity of W and a mass fraction of solids of 66%. The degree of alkylation and the molar mass of the crosslinker product were determined by C-13 NMR and by HPSEC analyses to be 1.5 mol of alkoxy groups per 1 mol of glyoxal, and 1.86 mol of alkoxy groups per 1 mol of ethylene urea, and 4500 g/mol, respectively.

EXAMPLE 2 (Comparative)

Example 4 of Sun Chemical U.S. Pat. No. 4,284,758, Butanol 290 g (2 mol) of a 40% aqueous glyoxal solution were charged to a 1 L reactor and the pH was adjusted to 6.4 with 0.69 g (0.008 mol) of solid sodium bicarbonate. 176 g (2 mol) of ethyleneurea were added, the pH was adjusted to 6.5 by addition of 25% strength aqueous sulphuric acid, and the reaction temperature was raised to (55±5)° C. After 2 hours, the reaction mixture was cooled to 38° C., and 462 g (6.23 mol) of 1-butanol were added. The pH of the mixture was adjusted to about 3.0 by adding 0.65 g (0.0066 mol) of concentrated sulphuric acid. The reaction temperature was then raised and held at reflux for 3 hours to effect butylation. Upon cooling to 30° C., the pH of the resin solution was adjusted to about 7.0 by adding 2.0 g of a 25% strength aqueous solution of caustic soda.

The product was a dark yellow emulsion (about 900 g) having a Gardner-Holdt viscosity of F and a mass fraction of solids of about 40%. The degree of alkylation and the molar mass of the crosslinker product were determined as supra. The following results were obtained: 1.22 mol of alkoxy groups per 1 mol of glyoxal, and 0.95 mol of alkoxy groups per 1 mol of ethylene urea, and 4300 g/mol, respectively.

EXAMPLE 3

Ethylated Ethyleneurea-Glyoxal Resin

A resin according to the invention is prepared by the following alternative procedures:

3a. Dehydration of Aqueous Aldehyde Solution Via Strip and Addition of Ethanol 559 g (3.85 mol) of a 40% strength aqueous solution of glyoxal at room temperature was charged to a 5 L reaction vessel followed by 2355 g (51.1 mol, 2.9 L) of anhydrous ethanol. The mixture was heated to from 45° C. to 50° C., and water together with excess ethanol were removed under reduced pressure (250 Torr [33 kPa] ramped to 150 Torr [20 kPa]). After two hours, approximately 72% of the excess ethanol had been removed and the mass fraction of water remaining in the reaction mixture was 13.5%. A second charge of anhydrous ethanol (1577 g, 34.2 mol) was added to the reactor and the distillation was continued at 46° C. under reduced pressure (135 Torr [18 kPa] to 125 Torr [17 kPa]) for an hour. Approximately 86% of the charged ethanol had been removed and the mass fraction of water remaining in the reaction mixture was less than 5%. The reaction solution was then cooled to ambient temperature.

To this dehydrated glyoxal solution, 900 g (19.5 mol) of anhydrous ethanol and 342.6 g (3.98 mol) of ethylene urea were charged. Final reaction mixture pH after additions was 3.85. The reaction mixture was then heated to from 45° C. to 48° C. and held for two hours. After two hours, the pH of the reaction mixture was adjusted to 2.9 by adding 25% strength aqueous sulphuric acid, and heating was then continued at from 49° C. to 53° C. for three additional hours. By adding 25% aqueous sodium hydroxide solution, pH was then adjusted to 4.6, and the reaction mixture was concentrated under reduced pressure (150 Torr [20 kPa] ramped to 23 Torr [3 kPa]) and at a temperatures of from 41° C. to 50° C. The light yellow resin solution (730 g) was then cooled to ambient temperature and 144 g of anhydrous ethanol were charged to obtain a final Gardner-Holdt viscosity of U and a mass fraction of solids of 63%. Degree of alkylation and molar mass of the crosslinker product were determined by C-13 NMR and by HPSEC analyses as 1.44 mol of alkoxy groups per 1 mol of glyoxal, and 1.11 mol of alkoxy groups per 1 mol of ethylene urea, and 4100 g/mol, respectively. Hazen APHA colour value of the crosslinker product determined in accordance with DIN ISO 6271 was 115.

3b. Dehydration of Aqueous Aldehyde Solution Via Glyoxal Concentration 947 g (6.5 mop of 40% strength aqueous solution of glyoxal were charged to a reaction vessel under a nitrogen purge, heated to from 61° C. to 66° C. and then concentrated under reduced pressure (23 Torr [3.1 kPa]). After eighty minutes, approximately 413 g of water had been removed to yield an aqueous glyoxal solution of approximately 71% strength as a viscous oil. This dehydrated glyoxal solution was then cooled to ambient temperature, 2400 g (52.1 mol) of anhydrous ethanol were charged, pH was adjusted to 3.3 with 26% strength aqueous sulphuric acid, and the resulting mixture was heated to from 61° C. to 70° C. for two and one half hours followed by cooling to ambient conditions. The mass fraction of water was approximately 5%. To this dehydrated ethanolic glyoxal solution, 572 g (6.6 mol) of ethylene urea were charged, and the reaction mixture was kept at (55±5)° C. for three hours. The reaction mixture was then cooled to 40° C., pH was adjusted to 2.8 to 3.0 with 26% strength aqueous sulphuric acid and the reaction temperature was then again raised to (55±5)° C. and maintained for approximately four hours. The reaction mixture was then cooled to 30° C., pH was adjusted to 3.3 to 3.7 by addition of sodium hydroxide solution, reheated to from 45° to 50° C., and then concentrated under reduced pressure (280 Torr [37 kPa] ramped to 155 Torr [20.7 kPa]) for four hours. The resulting light yellow resin solution (approximately 1.6 kg) having a Gardner-Holdt viscosity of G- was cooled to ambient conditions. The mass fraction of solids of the resin solution was approximately 62%. Degree of alkylation and molar mass of the crosslinker product were determined by C-13 NMR and by HPSEC analyses as 1.44 mol of alkoxy groups per 1 mol of glyoxal, and 1.14 mol of alkoxy groups per 1 mol of ethylene urea, and 3850 g/mol, respectively. Hazen APHA colour value of the crosslinker product determined in accordance with DIN ISO 6271 was 117.

EXAMPLE 4 (Comparative)

Example 4 of Sun Chemical U.S. Pat. No. 4,284,758, Ethanol 290 g (2 mol) of a 40% strength aqueous glyoxal solution were charged to a 1 L reactor and the pH was adjusted to 6.3 with 1.1 g (0.013 mop of solid sodium bicarbonate. 176 g (2 mot) of ethyleneurea were added, the pH was adjusted to 6.4 with 25% strength aqueous sulphuric acid, and the reaction temperature was raised to (55±5)° C. After 2 hours the reaction mixture was cooled to 40° C., and 288 g (6.25 mop of ethanol were added. pH of the mixture was adjusted to about 3.0 with 1.0 g (0.010 mal) of concentrated sulphuric acid. The reaction temperature was then raised and held at reflux for 3 hours to effect ethylation. Upon cooling to from 29° C. to 30° C., the pH of the resin solution was adjusted to about 7.1 with 3.2 g (0.20 mol) of a 25% strength aqueous solution of sodium hydroxide.

The product was a dark yellow solution (approximately 745 g) having a Gardner-Holdt viscosity of A-B and a mass fraction of solids of approximately 45%. Degree of alkylation and molar mass of the crosslinker product were determined by C-13 NMR and by HPSEC analyses as 1.13 mal of alkoxy groups per 1 mol of glyoxal, and 1.00 mol of alkoxy groups per 1 mol of ethylene urea, and 1840 g/mol, respectively. Hazen APHA colour value of the crosslinker product determined in accordance with DIN ISO 6271 was 468.

EXAMPLE 5

Comparative Cure Results

A master resin batch was prepared which was composed of 116.7 g of a short oil alkyd based on coconut oil (BECKOSOL® 12035, Reichhold Inc.), 20 g (0.27 mol) of 1-butanol, and 10 g of a mixture of toluene sulphonic acids dissolved in isopropanol (acid number of solution 135 mg/g; CYCAT® 4040 Catalyst, Cytec Industries Inc.). To portions of this master batch were then added the crosslinkers from Examples 1-4 in the amounts as stated in Table I infra, along with additional 1-butanol to provide a coating formulation with a mass fraction of solids of 45% and an overall mass ratio of binder to crosslinker of 70/30.

TABLE 1

| Crosslinker from Example | mass of crosslinker in g | mass of resin master batch in g | mass of butanol in g |
|---|---|---|---|
| 1 | 3.11 | 10 | 2.09 |
| 2 | 5.26 | 10 | −0.06 |
| 3 | 3.31 | 10 | 1.89 |
| 4 | 4.56 | 10 | 0.64 |

The formulations were drawn down on phosphated ®Bonderite 1000 cold rolled steel (CRS) panels, white-base coated steel panels and wood using a #52 wire-coater bar and were allowed to cure at ambient temperature.

The print resistance and pendulum hardness values of the resulting films on CRS panels were measured after 2 and 24 hrs and are tabulated in the following table 2:

TABLE 2

| Crosslinker of Example | 1 | 2 | 3 | 4 |
|---|---|---|---|---|
| Film Appearance | good | low gloss | good | low gloss |
| Gloss 20°/60° | — | — | 87/94 | 12/44 |
| 2 h; print resistance | 0 . . . 1 | 1 . . . 2 | 0 . . . 1 | 3 . . . 4 |
| 2 h; pendulum hardness | 42 | 19 | 46 | 28 |
| 24 h; pendulum hardness | 127 | 38 | 123 | 56 |
| 24 hr MEK rubs | 55 | 35 | 45 | <35 |

Film appearance was rated "good" if there were no defects visible to the naked eye; "low gloss" means a hazy appearance. Print resistance was determined in accordance with ASTM D 2091-96 (2003) "Standard Test Method for Print Resistance of Lacquers", a rating of "0" is "no mar", and a rating of "5" is "very marred". A rating of "1 . . . 2" stands for "between 1 and 2". "Pendulum" is the test according to König (ASTM D4366-95, EN ISO 1522 or DIN 53157) where oscillation damping is used as indicator for surface hardness, measured in seconds, after the specified drying time. Degree of crosslinking is judged by the number of double rubs with a pad soaked with methyl ethyl ketone (MEK) without impairment of the paint film.

From this data it is evident that the products of this invention (Examples 1 and 3) provide superior performance relative to the Sun Chemical patent derived products (Examples 2 and 4) in the areas of coating appearance (gloss), print resistance, pendulum hardness and degree of crosslinking.

EXAMPLE 6

Comparative Cure Results with an Aged Formulation

Formulations prepared with 6 day aged master batch detailed in Example 5 using the crosslinkers of Examples 1 and 2 were drawn down on Bonderite 1000 CRS panels and on glass plates and were allow to cure under ambient conditions.

The pendulum hardness values and MEK resistance of the resulting films on CRS panels were measured after 2 and 24 hrs and are tabulated in the following table 3:

TABLE 3

| Crosslinker of Example | 1 | 2 |
|---|---|---|
| Film Appearance | Slight haze | Very Hazy |
| Gloss 20°/60° | 95/98 | 2/10 |
| 2 h; pendulum hardness | 42 | 19 |
| 24 h; pendulum hardness | 163 | 141 |

TABLE 3-continued

| Crosslinker of Example | 1 | 2 |
|---|---|---|
| 24 h; MEK rubs | at 200: 20% removed | at 47: fail |
| Yellow Index, YI | 3.45 | 3.91 |

From these data it is evident that the combination of binder resin and crosslinker according to this invention (Crosslinker of Example 1) provided superior performance relative to the Sun Chemical patent derived product (Crosslinker of Example 2) in the areas of coating appearance (haziness and gloss), print resistance, pendulum hardness after 2 and 24 hours of cure, and degree of crosslinking as judged by the number of double rubs with a pad soaked with MEK rub resistance. With the crosslinker of Example 1, approximately 20% of the area covered with the coating was blank after 200 double rubs, i. e. the coating was removed.

As can be seen from the comparison, paint films formed with the crosslinker composition according to the invention have a better surface (gloss, haziness, colour) compared to the state of the art, and the curing speed at ambient temperature is far higher, as evidenced by the development of hardness, and the degree of crosslinking is markedly better even after aging.

EXAMPLE 7

Ethylated 4,5-Dihydroxyethylene Urea—Glyoxal Resin with Boric Acid

An ethylated dehydrated glyoxal solution having a mass fraction of 39% of solutes was prepared according to the procedure of Example 3a. 94.3 g of this solution containing 0.5 mol of glyoxal and its acetals and hemiacetals, 3.2 g of boric acid (0.05 mol), 3.2 g of anhydrous ethanol and 9.1 g of urea were mixed. The pH of the solution thus prepared was 2.57. This reaction mixture was heated to 55° C. and kept at this temperature under stirring for four hours. The Hazen APHA colour of this solution (DIN-ISO 6271) of this crosslinker resin solution was determined to be 77. This solution was then further concentrated by distillation under reduced pressure (20 kPa [150 Torr], ramped to 6.5 kPa [50 Torr], and a temperature that has been kept between 55° C. and 58° C.). After cooling to ambient temperature, 57 g of a light yellow resin solution with a mass fraction of solids of 73.5% were obtained. The degree of alkylation (amount of substance of alkoxy groups per amount of substance of glyoxal-derived moieties, and per amount of substance of alkoxy groups per amount of substance of dihydroxyethylene urea) was determined by $^{13}$C-NMR to be 1.98 mol/mol, and 3.38 mol/mol, respectively, and the molar mass was measured as 1015 g/mol by High-Performance Size Exclusion Chromatography using a polystyrene standard. Its Hazen APHA colour was 130.

EXAMPLE 8

Ethylated 4,5-Dihydroxyethylene Urea—Glyoxal Resin without Boric Acid

An ethylated dehydrated glyoxal solution having a mass fraction of 39% of solutes was prepared according to the procedure of Example 3a. 94.3 g of this solution containing 0.5 mol of glyoxal and its acetals and hemiacetals, 3.2 g of anhydrous ethanol and 9.1 g of urea were mixed. The pH of the solution thus prepared was 3.35. This reaction mixture was heated to 36° C. and kept at this temperature under stirring until homogeneous. pH was then adjusted to 2.62 by addition of 0.10 g of an aqueous solution of nitric acid having 70% strength, and the temperature was then raised to from 55° C. to 60° C. and kept at this temperature for four hours. The Hazen APHA colour of this solution (DIN-ISO 6271) of this crosslinker resin solution was determined to be 433. This solution was then further concentrated by distillation under reduced pressure (20 kPa [150 Torr], ramped to 6.5 kPa [50 Torr], and a temperature that had been kept between 55° C. and 58° C.). After cooling to ambient temperature, 52 g of a yellow resin solution with a mass fraction of solids of 67.1% were obtained. The degree of alkylation (amount of substance of alkoxy groups per amount of substance of glyoxal-derived moieties, and per amount of substance of alkoxy groups per amount of substance of dihydroxyethylene urea) was determined by $^{13}$C-NMR to be 2.39 mol/mol, and 3.30 mol/mol, respectively, and the molar mass was measured as 760 g/mol by High-Performance Size Exclusion Chromatography using a polystyrene standard. Its Hazen APHA colour was 231.

EXAMPLE 9

Comparative Cure Results with or without Boric Acid

A master resin batch was prepared which was composed of 70 g of a short oil alkyd based on coconut oil (BECKOSOL® 12035, Reichhold Inc.), 12 g (0.26 mol) of ethanol, 1.2 g (0.013 mol) of 1-methoxy-2-propanol, and 36.6 g (0.315 mol) of n-butyl acetate. To portions of this master batch were then added the crosslinkers from Examples 7 and 8 in the amounts as stated in Table 4 infra, along with additional n-butyl acetate and acid catalyst (mixture of toluene sulphonic acids dissolved in isopropanol, acid number of solution 135 mg/g; CYCAT® 4040 Catalyst, Cytec Industries Inc.) to provide a coating formulation with an overall mass ratio of binder to crosslinker of 70/30.

TABLE 4

| Crosslinker from Example | mass of crosslinker in g | mass of resin master batch in g | mass of butyl acetate in g | mass of acid catalyst in g |
| --- | --- | --- | --- | --- |
| 7 | 1.63 | 8 | 0.17 | 0.2 |
| 8 | 1.79 | 8 | 0.01 | 0.2 |

The formulations were drawn down on phosphated ®Bonderite 1000 cold rolled steel (CRS) panels, white-base coated steel panels and wood using a #52 wire-coater bar and were allowed to cure at ambient temperature.

The print resistance, pendulum hardness, and yellowness index values of the resulting films on CRS panels were measured after 1, 2 and 24 hrs and are tabulated in the following table 5:

TABLE 5

| Crosslinker of Example | 7 | 8 |
| --- | --- | --- |
| 1 h; print resistance | 2 . . . 3 | 4 . . . 5 |
| 2 h; pendulum hardness | 24 | 22 |
| 24 hr Yellowness Index | 1.78 | 3.77 |

Print resistance was determined in accordance with ASTM D 2091-96 (2003) "Standard Test Method for Print Resistance of Lacquers", a rating of "0" is "no mar", and a rating of "5" is "very marred". "Pendulum" is the test according to König (ASTM D4366-95, EN ISO 1522 or DIN 53157) where oscillation damping is used as indicator for surface hardness, measured in seconds, after the specified drying time. Yellowness Index (YI) is a number calculated from spectrophotometric data (ASTM E313) that describes the change in colour of a test sample from clear or white toward yellow.

From these data it is evident that the introduction of boric acid into a coating composition according to this invention (Example 7) provides enhanced performance relative to the non-boric acid containing product (Example 8) in the areas of print resistance, pendulum hardness, and specifically, yellowness index.

EXAMPLE 10

Ethylated Ethyleneurea-Glyoxal Resin

A resin according to the invention was prepared by the following procedure
(Dehydration of Aqueous Aldehyde Solution Via Strip and Addition of Ethanol):

559 g (3.85 mol) of a 40% strength aqueous solution of glyoxal at room temperature were charged to a 5 L reaction vessel followed by 2355 g (51.1 mol, 2.9 L) of anhydrous ethanol. The mixture was heated to from 45° C. to 50° C., and water together with excess ethanol were removed under reduced pressure (250 Torr [33 kPa] ramped to 150 Torr [20 kPa]). After two hours, approximately 72% of the excess ethanol had been removed and the mass fraction of water remaining in the reaction mixture was 13.5%. A second charge of anhydrous ethanol (1577 g, 34.2 mol) was added to the reactor and the distillation was continued at 46° C. under reduced pressure (135 Torr [18 kPa] to 125 Torr [17 kPa]) for an hour. Approximately 86% of the charged ethanol had been removed and the mass fraction of water remaining in the reaction mixture was less than 5%. The reaction solution was then cooled to ambient temperature.

To 93.5 g (0.5 mol) of this dehydrated glyoxal solution, 138 g (3.0 mol) of anhydrous ethanol and 43.0 g (0.50 mol) of ethylene urea were charged. Final reaction mixture pH after additions was 3.68, which was then adjusted to 2.88 by addition of nitric acid of 70% strength. The reaction mixture was then heated to a range of from 55° C. to 59° C. and held for two hours. The light yellow resin solution (202 g) was then cooled to ambient temperature and having a mass fraction of solids of 39%. Degree of alkylation and molar mass of the crosslinker product were determined by C-13 NMR and by HPSEC analyses as 1.31 mol of alkoxy groups per 1 mol of glyoxal, and 1.22 mol of alkoxy groups per 1 mol of ethylene urea, and 2350 g/mol, respectively. Hazen APHA colour value (DIN-ISO 6271) of the crosslinker product was measured as 27. Sodium ion content by ICP-AES was approximately 7 mg/kg.

EXAMPLE 11 (Comparative)

Example 4 of Sun Chemical U.S. Pat. No. 4,284,758, Ethanol 290 g (2 mol) of a 40% strength aqueous glyoxal solution were charged to a reactor having a volume of 1 L, and the pH was adjusted to 6.2 by addition of 0.7 g (0.009 mol) of solid sodium bicarbonate. 176 g (2 mol) of ethyleneurea were added, the pH was adjusted to 6.6 by addition of 25% strength aqueous sulphuric acid, and the reaction temperature was raised to (55±5)° C. After two hours, the reaction mixture was cooled to 40° C., and 288 g (6.25 mol) of anhydrous ethanol were added. pH of the mixture was adjusted to about 3.0 by addition of 0.9 g (0.009 mol) of concentrated sulphuric acid. The reaction temperature was then raised and held at reflux for three hours to effect ethylation. Upon cooling to 29° C. to 30° C., the pH of the resin solution was adjusted to about 7.0 by addition of 2.6 g (0.016 mol) of a 25% strength aqueous solution of sodium hydroxide.

The product was a deep yellow solution (approximately 742 g) having a Gardner-Holdt viscosity of A-, and a mass fraction of solids of approximately 48%. Degree of alkylation and molar mass of the crosslinker product were determined by C-13 NMR and by HPSEC analyses as 1.20 mol of alkoxy groups per 1 mol of glyoxal, and 1.02 mol of alkoxy groups per 1 mol of ethylene urea, and 2520 g/mol, respectively. Hazen APHA colour value (DIN-ISO 6271) of the crosslinker product was measured as 548. Sodium ion content by ICP-AES was 460 mg/kg.

EXAMPLE 12

Ethylated 4,5-Dihydroxyethylene Urea-Glyoxal Resin

A resin according to the invention was prepared by the following procedure
(Dehydration of Aqueous Aldehyde Solution Via Strip and Addition of Ethanol):

559 g (3.85 mol) of a 40% strength aqueous solution of glyoxal at room temperature were charged to a 5 L reaction vessel followed by 2355 g (51.1 mol, 2.9 L) of anhydrous ethanol. The mixture was heated to from 45° C. to 50° C., and water together with excess ethanol were removed under reduced pressure (250 Torr [33 kPa] ramped to 150 Torr [20 kPa]). After two hours, approximately 72% of the excess ethanol had been removed and the mass fraction of water remaining in the reaction mixture was 13.5%. A second charge of anhydrous ethanol (1577 g, 34.2 mot) was added to the reactor and distillation was continued at 46° C. under reduced pressure (135 Torr [18 kPa] to 125 Torr [17 kPa]) for an hour. Approximately 86% of the charged ethanol had been removed and the mass fraction of water remaining in the reaction mixture was less than 5%. The reaction solution was then cooled to ambient temperature.

To 93.5 g (0.5 mol) of this dehydrated glyoxal solution, 4 g (0.009 mol) of anhydrous ethanol and 9.1 g (0.152 mol) of urea were charged. Final reaction mixture pH after additions was 3.26, which was then adjusted to 2.7 by addition of nitric acid of 70% strength. The reaction mixture was then heated to a range of from 55° C. to 60° C. and held for four hours. The light yellow resin solution (85 g) was then cooled to ambient temperature and having a mass fraction of solids of 55%. Degree of alkylation and molar mass of the crosslinker product were determined by C-13 NMR and by HPSEC analyses as 1.57 mol of alkoxy groups per 1 mol of glyoxal, and 3.45 mol of alkoxy groups per 1 mol of 4,5-dihydroxyethylene urea, and 500 g/mol, respectively. Hazen APHA colour value (DIN-ISO 6271) of the crosslinker product was measured as 195. Sodium ion content by ICP-AES was approximately 2.9 mg/kg.

EXAMPLE 13 (Comparative)

Sun Chemical U.S. Pat. No. 4,284,758, with Ethanol 290 g (2 mol) of a 40% strength aqueous glyoxal solution were charged to a 1 L reactor and the pH was adjusted to 6.5 by addition of 0.7 g (0.009 mol) of solid sodium bicarbonate. 60 g (1 mol) of urea were added, the pH was adjusted to 6.6 by addition of 25% strength aqueous sulphuric acid, and the reaction temperature was raised to (55±5)° C. After two hours, the reaction mixture was cooled to 40° C., and 288 g (6.25 mol) of anhydrous ethanol were added. pH of the mixture was adjusted to about 3.0 by addition of 0.53 g (0.005 mol) of concentrated sulphuric acid. The reaction temperature was then raised and held at reflux for three hours to effect ethylation. Upon cooling to 29° C. to 30° C., the pH of the resin solution was adjusted to 7.03 by addition of 1.9 g (0.012 mol) of a 25% strength aqueous solution of sodium hydroxide.

The product was a deep yellow solution having a Gardner-Holdt viscosity of A-3 and a mass fraction of solids of approximately 35%. Degree of alkylation and molar mass of the crosslinker product were determined by C-13 NMR and by HPSEC analyses as 1.69 mol of alkoxy groups per 1 mol of glyoxal, and 1.27 mol of alkoxy groups per 1 mol of 4,5-dihydroxyethylene urea, and 300 g/mol, respectively. Hazen APHA colour value (DIN-ISO 6271) of the crosslinker product was measured as 298. Sodium ion content by ICP-AES was 560 mg/kg.

EXAMPLE 14

Comparative Cure Results at 2% Catalyst Loading

To individual water-borne resin batches composed of 10.2 g of an aqueous hydroxyl functional acrylic emulsion (Roshield™ 1024 hydroxy functional acrylic emulsion, mass fraction of solids 50%, Rohm & Haas Co.), 0.2 g of a rheology modifier (Acrysol™ RM-12W, combination of polyurethane resin and enzymatically modified starch, mass fraction of solids 19%, Rohm & Haas Co.) and 0.37 g of a mixture of toluene sulphonic acids dissolved in isopropanol (mass fraction of solids: 40%, acid number of solution: 135 mg/g; CYCAT® 4040, Catalyst, Cytec Industries Inc.) were then added the crosslinkers from Examples 9 to 12 in the amounts as stated in table 6 infra, along with additional methanol and water to provide coating formulations with a mass fraction of solids of 43.6% and an overall mass ratio of binder to crosslinker of 70/30. "Catalyst Loading" in this context means ratio of mass of catalyst to mass of total resin solids of the formulation.

TABLE 6

| Crosslinker of Example | mass of crosslinker in g | mass of resin master batch in g | mass of methanol in g | mass of water in g |
| --- | --- | --- | --- | --- |
| 9 | 5.6 | 10.77 | 0.3 | 0.6 |
| 10 | 4.6 | 10.77 | 0.2 | 1.7 |
| 11 | 4.0 | 10.77 | 0.3 | 2.2 |
| 12 | 6.3 | 10.77 | 0.29 | 0 |

The formulations were drawn down on white-base coated cold rolled steel (WBC-CRS) panels (4 inch×12 inch, ACT Lab, Inc.), glass panels, and wood using a #52 wire-coater bar and were cured at ambient temperature and baked conditions (fifteen minutes flash/ten minutes at 60° C./cool for five minutes).

The MEK resistance, pendulum hardness values, and Yellowness Index (YI) of the resulting films on CRS (cold rolled steel) panels and glass were measured after one hour and after twenty-four hours, and are tabulated in the following table 7 (ethyleneurea-glyoxal resin) and table 8 (4,5-dihydroxyethylene urea-glyoxal resin):

TABLE 7

| Crosslinker of Example | 10 | 11 | 10 | 11 |
|---|---|---|---|---|
| Cure conditions | Ambient | Ambient | 10 min/60° C. | 10 min/60° C. |
| 1 h; pendulum hardness | 93 s | 68 s | 114 s | 91 s |
| 1 h; MEK rubs | 200 | 30 | 60 | <50 |
| 24 h; pendulum hardness | 105 s | 83 s | 106 s | 61 s |
| 24 h; YI | −1.1 | −0.6 | −1.0 | −0.6 |
| 12 d; Water spot resistance (1 h) | Slight haze 8MD | Strong Haze 6D | Very Slight Haze 8MD | Strong Haze 6D |

TABLE 8

| Crosslinker of Example | 12 | 13 | 12 | 13 |
|---|---|---|---|---|
| Cure conditions | Ambient | Ambient | 10 min/60° C. | 10 min/60° C. |
| 1 h; pendulum hardness | n.d. | n.d. | 35 s | 21 s |
| 1 h; MEK rubs | 30 | 30 | <50 | <50 |
| 24 h; pendulum hardness | 36 s | 35 s | n.d. | n.d. |

"Pendulum" is the test according to König (ASTM D4366-95, EN ISO 1522 or DIN 53157) where oscillation damping is used as indicator for surface hardness, measured in seconds, after the specified drying time. "n. d." stands for "not determined". Degree of crosslinking is judged by the number of double rubs with a pad soaked with methyl ethyl ketone (MEK) without impairment of the paint film. Yellowness Index (YI) is a number calculated from spectrophotometric data (ASTM E313) that describes the change in colour of a test sample from clear or white toward yellow. Water spot resistance is the test according to ASTM D 1308-02 "Standard Test Methods for Effect of Household Chemicals on Clear and Pigmented Organic Finishes" involving placement of drop of water on the film which is covered for a specific length of time and the degree of blistering, swelling, softness or haziness is then assessed. For blistering in accordance with ASTM D714-02e1 "Standard Test Method for Evaluating Degree of Blistering of Paints" a rating scale was used where 2=large blisters and 10=no blisters and density of blistering is indicated by F=few, M=medium, MD=medium dense, and D=dense.

From the data in tables 7 and 8 it is evident that the products of this invention (Examples 10 and 12) provide equivalent or superior performance relative to the Sun Chemical patent derived products (Examples 11 and 13) in the areas of pendulum hardness, yellowness index, water spot resistance and degree of crosslinking.

EXAMPLE 15

Comparative Cure Results at 4% Catalyst Loading

To individual water-based resin batches composed of 10.2 g of an aqueous hydroxyl functional acrylic emulsion (Roshield™ 1024 emulsion, Rohm & Haas Co.) and 0.73 g of a mixture of toluene sulphonic acids dissolved in isopropanol (mass fraction of solids: 40%, acid number of solution: 135 mg/g; CYCAT® 4040, Catalyst, Cytec Industries Inc.) were then added the crosslinkers from Examples 9 to 12 in the amounts as stated in table 9 infra, along with additional methanol and water to provide coating formulations with a mass fraction of solids of 43.6% and an overall mass ratio of binder to crosslinker of 70/30.

TABLE 9

| Crosslinker from Example | mass of crosslinker in g | mass of resin master batch in g | mass of methanol in g | mass of water in g |
|---|---|---|---|---|
| 9 | 5.6 | 10.73 | 0.3 | 0.6 |
| 10 | 4.6 | 10.73 | 0.2 | 1.7 |
| 11 | 4.0 | 10.73 | 0.3 | 2.2 |
| 12 | 6.3 | 10.73 | 0.29 | 0 |

The formulations were drawn down on white-base coated cold rolled steel (WBC-CRS) panels (4 inch×12 inch, ACT Lab, Inc.) glass panels and wood using a #52 wire-coater bar and were cured at ambient temperature and baked conditions (fifteen minutes flash/ten minutes at 60° C./cool for five minutes).

The MEK resistance, pendulum hardness values, and Yellowness Index (YI) of the resulting films on CRS panels and glass were measured after one hour, after twenty-four hours and after forty-eight hours and are tabulated in the following table 10 (ethyleneurea-glyoxal resin) and table 11 (4,5-dihydroxyethylene urea-glyoxal resin):

TABLE 10

| Crosslinker of Example | 10 | 11 | 10 | 11 |
|---|---|---|---|---|
| Cure conditions | Ambient | Ambient | 10 min/60° C. | 10 min/60° C. |
| 1 h; pendulum hardness | 97 s | 97 s | n.d. | n.d. |
| 24 h; pendulum hardness | 115 s | 71 s | n.d. | n.d. |
| 48 h; YI | −1.1 | −0.6 | −0.5 | −0.2 |
| Water spot resistance, 1 h | n.d. | n.d. | 8M | 4MD |

TABLE 11

| Crosslinker of Example | 12 | 13 | 12 | 13 |
|---|---|---|---|---|
| Cure conditions | Ambient | Ambient | 10 min/60° C. | 10 min/60° C. |
| 1 h; MEK rubs | <50 | 30 | n.d. | n.d. |
| 24 h; MEK rubs | 35 | 35 | n.d. | n.d. |
| 48 h; YI | 4.9 | 25.5 | 17.9 | 67.5 |
| Water spot resistance, 1 h | n.d. | n.d. | No haze (10) | Slight haze |

Water spot resistance is the test according to ASTM D 1308-02 "Standard Test Methods for Effect of Household Chemicals on Clear and Pigmented Organic Finishes" involving placement of drop of water on the film which is covered for a specific length of time and the degree of blistering, swelling, softness or haziness is then assessed. For blistering in accordance with ASTM D714-02e1 "Standard Test Method for Evaluating Degree of Blistering of Paints" a rating scale was used where 2=large blisters and 10=no blisters and density of blistering is indicated by F=few, M=medium, MD=medium dense, and D=dense.

From the data in Tables 10 and 11 it is evident that the products of this invention (crosslinkers of Examples 10 and 12) provide equivalent or superior performance relative to the Sun Chemical patent derived products (crosslinkers of Examples 11 and 13) in the areas of pendulum hardness, Yellowness index, water spot resistance, and degree of crosslinking.

What is claimed is:

1. A process for the preparation of a crosslinker composition, comprising the steps of
providing a mixture of an aliphatic alcohol A having at least one hydroxyl group and from 1 to 10 carbon atoms, with at least one multifunctional aldehyde C having at least two aldehyde groups —CHO to form a mixture AC,
heating the mixture AC to convert at least a part of the multifunctional aldehyde C to its hemiacetal or to its acetal to form a mixture (AC)',
adding to the mixture (AC)' at least one cyclic urea U or the educts to produce the said cyclic urea U in situ, which cyclic urea U has at least one unsubstituted >NH group, and reacting the mixture thus obtained to form a chemical bond between the nitrogen atom of the at least one unsubstituted >NH group of the at least one cyclic urea U, and the carbon atom of the least one aldehyde group —CHO of the multifunctional aldehyde C,
wherein boric acid $H_3BO_3$ is added to the mixture AC, or to the mixture (AC)', or to both mixtures AC and (AC)'.

2. The process of claim 1, which further comprises reacting, after the last step of claim 1, the reaction product obtained in the said last step of claim 1 with the aliphatic alcohol A, whereby at least a part of the hydroxyl groups of the said alcohol A is converted to ether groups.

3. The process of claim 1, wherein the at least one cyclic urea U is selected from the group U1 consisting of ethylene urea, 4-hydroxyethylene urea, 4,5-dihydroxy ethylene urea, and glycoluril, and from the group U2 consisting of the ureas U1 which additionally have at least one substituent R on at least one of the nitrogen or carbon atoms of the said ureas U1, with the proviso that at least one nitrogen atom is unsubstituted, and the substituent R is selected from the group consisting of linear, branched and cyclic alkyl groups having from 1 to 10 carbon atoms.

4. The process of claim 1, wherein the at last one cyclic urea U is formed in situ by reaction of a urea, a di-urea or a polyurea having one, two or more than two groups of the structure —NH—CO—NH— in their molecules with a polyfunctional aldehyde having more than one aldehyde groups per molecule.

5. The process of claim 1, wherein a mixture of ethylene urea and 4,5-dihydroxyethylene urea is used as the at least one cyclic urea U.

6. The process of claim 1, wherein glyoxal is used as multifunctional aldehyde C.

7. The process of claim 1 wherein the amount of boric acid $H_3BO_3$ which is added to the mixture AC, or to the mixture (AC)' or to both mixtures AC and (AC)', measured as the ratio of the amount of substance $n_B$ of boric acid $H_3BO_3$ to the sum $n_G$ of the amounts of substance of glyoxal, of the hemiacetal of glyoxal, and of the acetal of glyxal, is from 0.5% to 25%.

8. A coating composition comprising a binder resin B which has functional groups selected from the group consisting of hydroxyl groups and carboxylic acid groups, and a crosslinking composition prepared by the process of claim 1.

9. A coating composition comprising a binder resin B which has functional groups selected from the group consisting of hydroxyl groups and carboxylic acid groups, and a crosslinking composition prepared by the process of claim 2.

10. The coating composition of claim 8 wherein the binder resin B is selected from the group consisting of hydroxyfunctional alkyd resins, hydroxyfunctional acrylic resins, hydroxyfunctional polyurethane resins, and hydroxyfunctional epoxy resins, as well as mixtures thereof.

11. The coating composition of claim 8 wherein the binder resin B is present in the form of an aqueous dispersion.

12. A method of use of the coating composition of claim 8 comprising adding thereto a catalyst selected from the group consisting of organic sulphonic acids, applying the mixture thus prepared to a substrate by spraying, brushing, dipping, or with a doctor blade.

13. The method of claim 12 wherein the coating composition and catalyst are applied to a substrate selected from the group consisting of paper, cardboard, textiles, leather, wood, plastics, and metals.

14. The process of claim 1 wherein the amount of boric acid $H_3BO_3$ which is added to the mixture AC, or to the mixture (AC)' or to both mixtures AC and (AC)', measured as the ratio of the amount of substance $n_B$ of boric acid $H_3BO_3$ to the sum $n_G$ of the amounts of substance of glyoxal, of the hemiacetal of glyoxal, and of the acetal of glyxal, is from 1% to 20%.

15. The process of claim 1 wherein the amount of boric acid $H_3BO_3$ which is added to the mixture AC, or to the mixture (AC)' or to both mixtures AC and (AC)', measured as the ratio of the amount of substance $n_B$ of boric acid $H_3BO_3$ to the sum $n_G$ of the amounts of substance of glyoxal, of the hemiacetal of glyoxal, and of the acetal of glyxal, is from 3% to 15%.

* * * * *

UNITED STATES PATENT AND TRADEMARK OFFICE
CERTIFICATE OF CORRECTION

PATENT NO. : 8,460,758 B2
APPLICATION NO. : 12/745996
DATED : June 11, 2013
INVENTOR(S) : Flood et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 256 days.

Signed and Sealed this
Eighth Day of September, 2015

Michelle K. Lee
*Director of the United States Patent and Trademark Office*